United States Patent [19]

Martindale, Jr.

[11] 4,392,403

[45] Jul. 12, 1983

[54] PORTABLE PALLET APPARATUS

[75] Inventor: Troy E. Martindale, Jr., Reynoldsburgh, Ohio

[73] Assignee: The B. F. Goodrich Company, New York, N.Y.

[21] Appl. No.: 268,615

[22] Filed: Jun. 1, 1981

[51] Int. Cl.³ .............................................. B23D 31/00
[52] U.S. Cl. ..................................... 83/418; 83/401; 83/527; 83/600; 83/925 R; 83/928; 29/426.4; 30/379
[58] Field of Search ................. 83/401, 418, 598, 600, 83/928, 527, 925 R; 30/180, 187, 379; 29/426.4; 144/34 E

[56] References Cited

U.S. PATENT DOCUMENTS

| | | | |
|---|---|---|---|
| 3,196,726 | 7/1965 | Mordan | 30/379 X |
| 3,807,472 | 4/1974 | Propst | 144/34 E |
| 3,869,780 | 3/1975 | Ginnow | 83/477 |
| 3,913,641 | 10/1975 | White | 144/34 E |
| 4,112,578 | 9/1978 | Sanford | 29/426.4 X |

*Primary Examiner*—James M. Meister
*Attorney, Agent, or Firm*—Joseph Januszkiewicz

[57] ABSTRACT

A portable apparatus that can be wheeled to a pallet supported by a conveyor for selective removal of nails that interconnect the stringers with the deckboards. The portable apparatus has a platform that is moveable in a vertical direction to position the cutting means at the juncture of the stringer with the deckboards. Such apparatus has a pair of pivotal cutting means that are moveable toward each other into intermeshing contact to shear nails.

6 Claims, 6 Drawing Figures

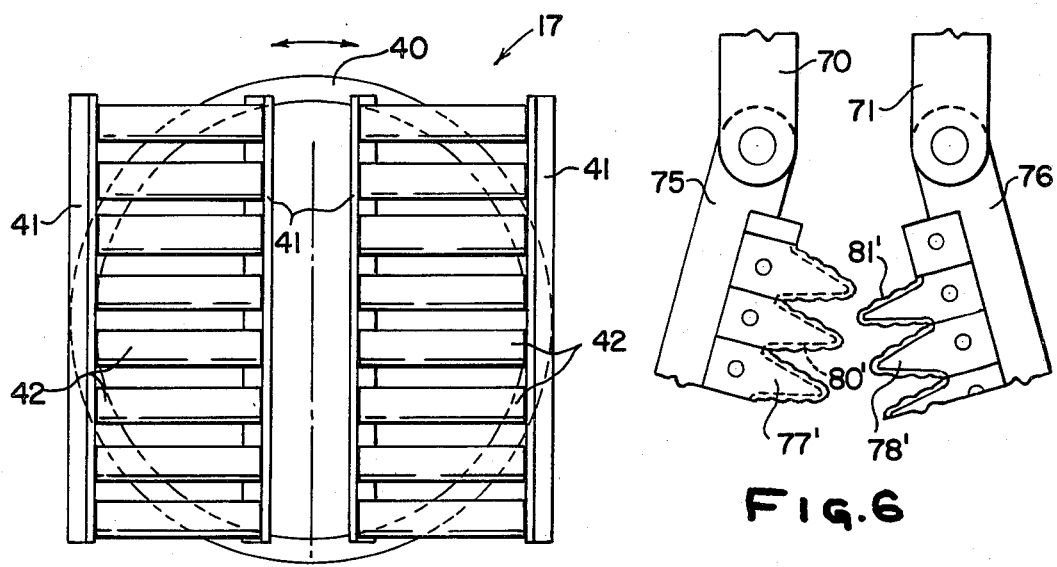
FIG. 6
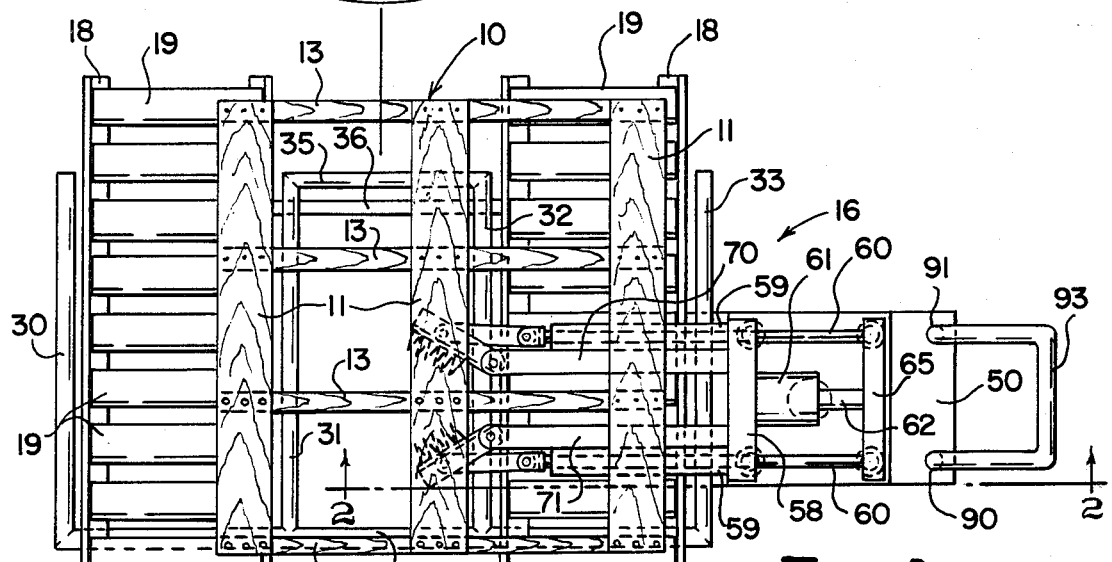
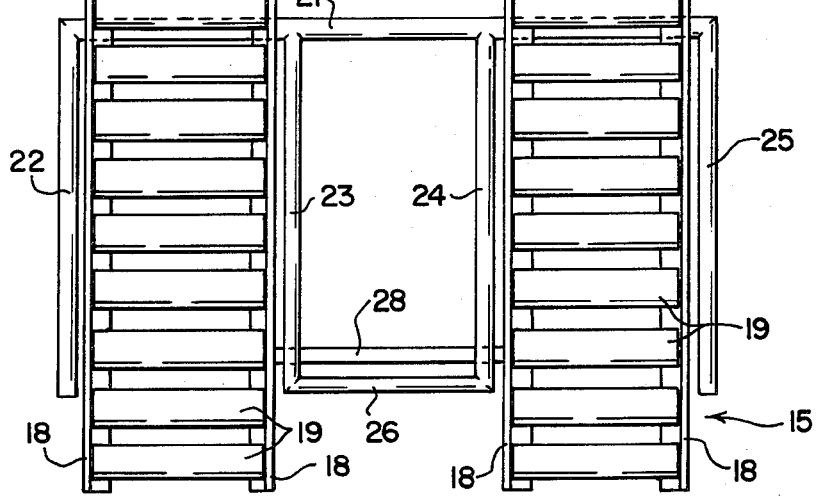
FIG. 1

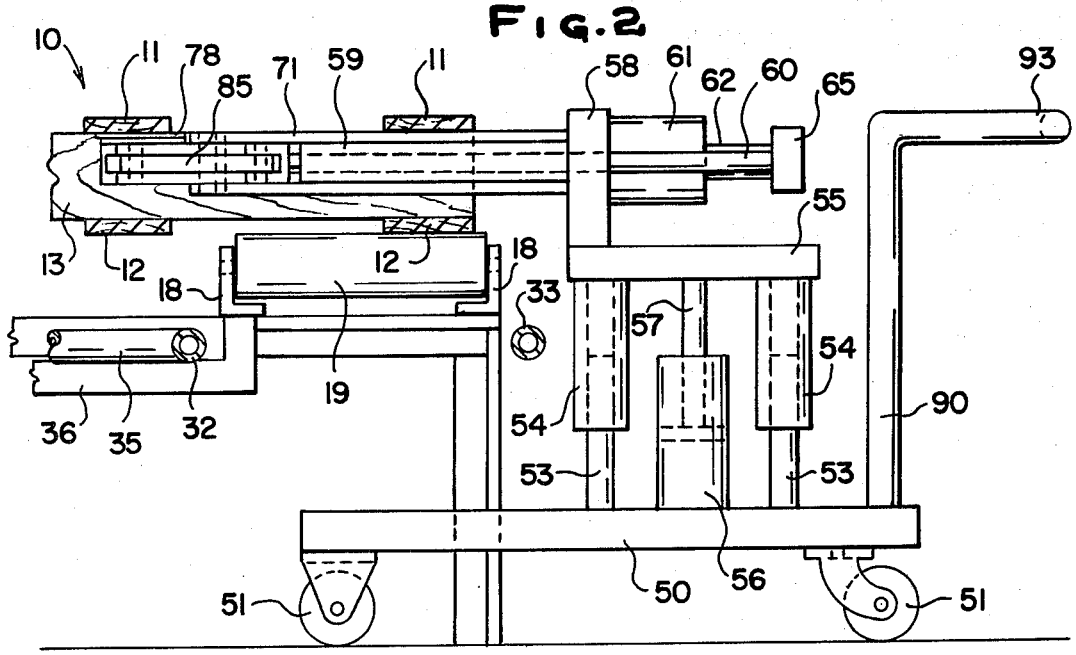
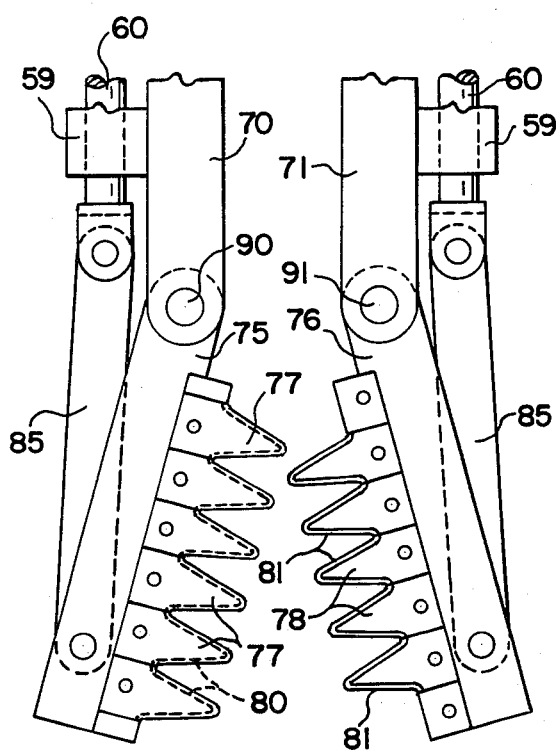
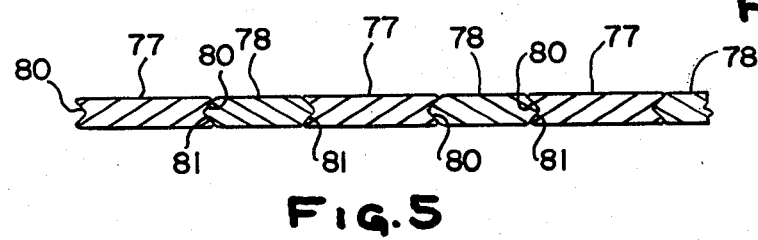

PORTABLE PALLET APPARATUS

BACKGROUND OF THE INVENTION

This invention relates to an apparatus for repairing pallets and more particularly to a portable apparatus that can selectively remove certain stringers or deckboards in a wooden pallet to permit on site repair.

Wooden pallets are used extensively in the transportation storage and moving of boxed, crated, bagged or strapped loads by various means such as fork lift trucks or similar machinery. In their process of use, the pallets are damaged to various degrees. Heretofore the damaged pallets were discarded because it was economically not feasible to repair them. More recently, it was found possible to repair them by providing a stationary machine such as disclosed by U.S. Pat. Nos. 4,152,819 and 3,869,780. Such machines facilitated the repair of stringers or deckboards.

The present invention provides a new and improved means that is portable yet efficiently removes selective stringers and deckboards from a pallet and permits repair at sites that are closely adjacent to their area of use, thereby eliminating the need for expensive pallet repair machines. Such portable repair apparatus permits their use by users without requiring expensive capital investments.

BRIEF DESCRIPTION OF THE DRAWINGS

FIG. 1 is a plan view of a portable pallet repairing apparatus showing a pallet thereon.

FIG. 2 is a side elevational view of the pallet repairing apparatus taken on line 22 of FIG. 1.

FIG. 3 is an enlarged plan view of a portion of the pallet apparatus showing the shearing means in an open position.

FIG. 4 is an enlarged plan view of a portion of the pallet apparatus showing the shearing means in a closed portion.

FIG. 5 is an enlarged cross-sectional view of the shearing means taken on line 55 of FIG. 4.

FIG. 6 is an enlarged fragmentary plan view of a modified form of nail shearing means.

DETAILED DESCRIPTION

Referring to the drawings wherein similar numerals refer to similar parts throughout the several views, there is shown in FIGS. 1 and 2 a wood pallet 10 having a plurality of spaced upper deckboards 11 and a plurality of spaced lower deckboards 12 separated by stringers 13. The deckboards are connected to the stringers by nails. There is no difference in the upper or lower deckboards except for convenience of reference in discussing the structure and operation of the portable pallet repairing apparatus. Although the pallet is shown as having three upper and three lower deckboards, the apparatus to be described is capable of handling pallets with a greater number of deckboards as well as a greater number of stringers.

The portable pallet repair apparatus cooperates with a receiving conveyor 15, a work station 16, and a turntable or repair station 17.

Receiving conveyor 15 and work station 16 have a base frame which includes two pairs of spaced side members 18 journaling rollers 19. The side members 18 and the rollers 19 extend for the full length of the conveyor 15 and the work station 16 to facilitate the movement of pallets thereon.

The juncture of the receiving conveyor 15 and the work station 16 support for rotation a pair of horizontally extending tubular members 20 and 21. As seen in FIG. 1, a plurality of longitudinally extending tubular members 22, 23, 24, and 25 have their one ends suitably secured to the horizontally extending tubular member 21 for rotation about the axis of such tubular member 21. The other ends of tubular members 23 and 24 are joined by a tubular member 26. The outboard ends of members 23 and 24 rest on a support member 28 that extends between the inner ones of the spaced side members 18. An operator, by grasping tubular member 22 or 25 is able to rotate member 21 and pivot members or tubular members 22, 23, 24 and 25 about the axis of tubular member 21 such that a pallet resting thereon will be pivoted into position on the work station 16.

The work station 16 has a plurality of longitudinally extending tubular members 30, 31, 32, and 33 with their one ends suitably joined to the rotatable tubular member 20. Tubular members 31 and 32 are joined at their other ends by a tubular member 35. The outboard ends of tubular members 31 and 32 rest on a horizontally extending member 36 that extends between and is connected to the inner ones of the spaced side members. The tubular members 30, 31, 32, and 33 in cooperation with tubular members 22, 23, 24, 25 by their simultaneous rotation about the axes of tubular members 20 and 21 respectively are able to move, flip, or pivot a pallet between the receiving conveyor 15 and the work station 16.

Turntable 17 has a suitable base frame that supports for rotation an annular member 40, which member 40 in turn supports four longitudinally extending supports 41 that are L-shaped in cross sections. Adjacent pairs of supports 41 journal for rotation a plurality of aligned idler rollers 42. A pallet moved from work station 16 onto rollers 42 permit its repair thereon or pivoting thereon along with the annular member 40 of turntable 17 such that the pallet may be moved manually back onto the work station 16 for removal of the nail from a preselected deckboard that is now closely adjacent to a portable pallet apparatus that can shear the nails to permit removal of a broken stringer or deckboard.

The portable pallet apparatus has a support frame 50 with wheels 51 suitably journaled thereon. Support frame 50 has a plurality of vertically extending guide bars 53 secured thereto. Journaled for reciprocal movement on the guide bars 53 are sleeves 54. The upper ends of the respective sleeves 54 are secured to a platform or a support member 55. A hydraulic cylinder 56 is secured to the support frame 50 with its piston rod 57 secured to the platform 55. Pressurization of the rod end of cylinder 56 moves the piston rod 57 along with platform 55 in a downward direction whereas pressurization of the head end of cylinder 56 raises the platform 55 in a vertical direction. A cross brace 58 is suitably mounted on platform 55 for movement therewith. A pair of laterally spaced guide sleeves 59 are secured to the forward portion of cross brace 58 to guide elongated guide bars or rods 60 slideably received therein. A hydraulic cylinder 61 is secured to the intermediate portion of the cross brace 58 having its piston rod 62 extending outward therefrom and attached to a cross bar 65. The respective end portions of cross bar 65 are secured to one end of the respective guide bars 60 such that pressurization of the cylinder 61 will effect reciprocation of the guide bars 60 dependent upon the selective pressurization of the head end or the rod end thereof. A pair of laterally spaced supports 70 and 71 parallel to the guide sleeves 59 extend horizontally outwardly from the cross brace 58 and have their one ends rigidly secured outwardly to the cross brace 58. The respective sleeves 59 are secured along the respective sides to the adjacent support members 70 and 71. The cross brace 58, the support members 70, 71 and sleeves 59 define support means for the nail shearing tools to be described.

Pivotally secured to the respective support members 70 and 71 are cutter support bars 75 and 76, each having a plurality of cutting tools 77 and 78. Each cutting tool 77 has a rectangular shaped shank portion that is secured to the support bar 75 and a triangular shaped forward cutting portion that is recessed as at 80 along the entire side. Each cutting tool 78 has a rectangular shaped shank portion that is secured to the support bar 76 and a triangular shaped forward cutting portion that tapers outwardly as at 81 to complement the recess 80 on an adjacent cutting tool 77. The outboard end of each cutter support bar 75 and 76 is pivotally connected by a lever member 85 to the respective guide bars 60.

Pressurization of the head end of cylinder 61 moves the respective guide bars 60 in a rightward direction as viewed in FIG. 1 thereby pivoting the respective support bars 75 and 76 away from each other into the position shown in FIG. 3 such the respective cutting tools 77 and 78 are in a position for movement into position for cutting or shearing nails in the pallet whereas pressurization of the rod end of cylinder 61 moves the respective guide bars 60 in a leftward direction as seen in FIG. 1 thereby pivoting the respective support bars 75 and 76 toward each other such that the respective cutting tools come into abutting engagement to shear nails that are positioned therebetween.

To facilitate the movement of the apparatus to and from the work sites, a pair of vertically extending brackets 90 and 91 have their one ends secured to support frame 50. The other ends of brackets 90 and 91 are shaped into a horizontally extending U-shaped portion 93.

A modified form of cutting tools 77' and 78' is shown in FIG. 6 wherein the triangular portion of the cutters is scalloped rather than linear in contour and having the same correspondending scalloped grooves 80' and tapering cutting edge 81'.

Assuming a pallet is placed on the receiving conveyor 15 such that the deckboard to be removed is resting on the rollers 19. The operator pivots the tubular members 30, 31, 32, 33 about tubular member 20 until such tubular members rest on the pallet. The operator then pivots the pallet as sandwiched between the upper tubular members 30, 31, 32 and 33 and the lower tubular members 22, 23, 24 and 25 about tubular members 20 and 21 such that the pallet is now positioned to rest on the rollers 19 in the work station 16 as shown in plan view in FIG. 1. The portable pallet apparatus is thence moved into the work station such that the pair of support bars 75 and 76 with their cutting tools 77 and 78 are in the open position to permit the position of such cutting tools adjacent to the nails that connect the deckboard to be severed from the stringer. The hydraulic cylinder 56 is selectively pressurized such that the platform 55 is elevated to position the cutting tools 77 and 78 at the juncture of the stringer with the deckboard to be removed. The rod end of hydraulic cylinder 61 is then pressurized to move piston rod 62 along with guide bars 60 and 61 leftwardly as viewed in FIG. 1 to pivot the cutter support bars 75 and 76 about pivots 90 and 91 respectively such that the cutting tools 77 and 78 are moved toward each other into intermeshing contact which shears any nails therebetween. The cutting tools 77 and 78 are released by pressurization of the head end of cylinder 61. This operation is repeated as necessary to shear additional nails. As seen in FIG. 1, the cutting tools 77 and 78 cannot reach the outermost nails between the deckboards and the stringers; however this can be accomplished by making the guide bars 60 and 61 longer. In lieu of this, the pallet can be moved to the turntable 17 or repair station 16, rotated 180 and then moved back to the work station 16 such that the outermost portion of the deckboard that has to be worked on is now closely adjacent to the portable pallet repair machine.

The rod end of hydraulic cylinder 61 is pressurized to pivot the respective cutter support bars 75 and 76 about pivots 90 and 91 which mesh the respective cutting tools 77 and 78 thereby shearing the remaining nails between the deckboards and the stringer to permit removal of the deckboard. The pallet is then pushed onto the turntable 17 or repair station 16 for repair of the pallet or for stacking.

The modified cutting tools 77' and 78' provide a novel shearing action particularly since the nails to be sheared are in groups and the scalloped surface distributes the shearing forces in a manner to facilitate the shearing action.

It will be apparent that, although a specific embodiment and certain modifications of the invention have been described in detail, the invention is not limited to the specifically illustrated and described constructions since variations may be made without departing from the principles of the invention.

What is claimed is:

1. A portable pallet nail shearing apparatus having a support frame with wheels thereon for movement to a work area, a platform mounted above said support frame, power means interconnecting said platform to said support frame and operative to selectively raise or lower said platform relative to said support frame a predetermimed distance, guide means mounted between said platform and said support frame to maintain vertical alignment therebetween, support means mounted on said platform for movement therewith, said support means has a cross brace with a pair of guide sleeves mounted thereon, each of said sleeves having a guide rod slidably received therein, a pair of laterally spaced tool holders mounted on said support means for pivotal movement toward and away from each other along a horizontal plane, power operated means mounted on said support means and operatively connected to said guide rods, said guide rods pivotably connected to said tool holders for pivoting said spaced tool holders upon actuation of said power actuating means, and each tool holder having a plurality of cutting tools that are moveable into and out of intermeshing engagement for shearing operation.

2. A portable pallet apparatus as set forth in claim 1 wherein the intermeshing portions of all of said cutting tools are triangular shaped in plan, each cutting tool having a pair of side edges and a base for attachment to said tool holder, all of said cutting tools on one of said tool holders having an upper portion and a lower portion that taper along their outer perimeter of said side edges inwardly to the medium thereof to define a groove along the medium of both side edges, and all of said cutting tools in the other one of said tool holders having an upper portion and a lower portion that taper along their outer perimeter outwardly to define a cutting edge along both sides that are adapted to mesh with adjacent grooves of said cutting tools of said one tool holder.

3. A portable pallet apparatus as set fourth in claim 2 wherein said side edges of said cutting tools have scalloped portions.

4. A portable pallet nail shearing apparatus having a support frame with wheels, a platform mounted above said support frame, power means interconnecting said platform to said support frame and operative to selectively raise or lower said platform relative to said support frame, guide means mounted between said platform and said support frame to maintain vertical alignment therebetween, support means mounted on said platform for movement therewith, a pair of laterally spaced tool holders mounted on said support means for pivotal movement toward and away from each other along a horizontal plane, power actuating means mounted on said support means for pivoting said spaced tool holders, each tool holder having a plurality of cutting tools that are moveable into and out of intermeshing engagement, said intermeshing portions of all of said cutting tools are triangular shaped in plan, each cutting tool having a pair of side edges and a base for attachment to said tool holder, all of said cutting tools on one of said tool holders having an upper portion and a lower portion that taper along their outer perimeter inwardly to define a groove along both side edges, all of said cutting tools in the other one of said tool holders having an upper portion and a lower portion that tapers along their outer perimeter outwardly to define a cutting edge along both sides that is adapted to mesh with adjacent grooves of said cutting tools of said one tool holder, said actuating means includes a pair of spaced rod connected to said tool holders and a hydraulic cylinder mounted on said support means, and said hydraulic cylinder operatively connected to said pair of spaced rods for pivoting said tool holders.

5. A portable pallet apparatus as set forth in claim 4 wherein guide sleeves are mounted on said support means for guiding a reciprocable movement of said rods.

6. A portable pallet apparatus as set forth in claim 5 wherein said cutting edges of said cutting tools are scalloped to provide a shearing action.

* * * * *